July 27, 1948.                R. W. PORTER ET AL                2,446,024
                              DIRECTIVE RADIO SYSTEM
Filed March 13, 1943                                         4 Sheets-Sheet 3

Fig. 3.

Inventors:
Richard W. Porter,
Anthony G. Linowiecki,
by Harry E. Dunham
    Their Attorney.

July 27, 1948.  R. W. PORTER ET AL  2,446,024
DIRECTIVE RADIO SYSTEM
Filed March 13, 1943  4 Sheets-Sheet 4

Fig. 6a.
VOLTAGE BETWEEN
CONDUCTORS 114-114'

Fig. 6b.
VOLTAGE BETWEEN
CONDUCTORS 35

Fig. 6c.
VOLTAGE BETWEEN
CONDUCTORS 34

TARGET BELOW AXIS OF ROTATION

TARGET RIGHT OF AXIS OF ROTATION

TARGET ABOVE AXIS OF ROTATION

TARGET LEFT OF AXIS OF ROTATION

Inventors:
Richard W. Porter,
Anthony G. Linowiecki,
by Harry E. Dunham
Their Attorney.

Patented July 27, 1948

2,446,024

UNITED STATES PATENT OFFICE 2,446,024

DIRECTIVE RADIO SYSTEM

Richard W. Porter, Schenectady, N. Y., and Anthony G. Linowiecki, Minneapolis, Minn., assignors to General Electric Company, a corporation of New York Application March 13, 1943, Serial No. 478,994

13 Claims. (Cl. 343—7)

Our invention relates to directive radio systems and more particularly to certain improvements with respect to the control of the orientation thereof.

In copending application Serial No. 414,126 of Sidney Godet filed October 8, 1941, and entitled Directive radio system, now Patent No. 2,412,612 issued December 17, 1946, which application is assigned to the same assignee as our present application, is disclosed a directive radio system having means whereby it is maintained oriented in the direction of propagation of received waves. Thus if the system be carried by an aircraft and is directed at a remote craft from which it receives radio waves, as by reflection of waves radiated from the system, or by reception of waves radiated from the remote craft, the system is automatically maintained directed at the remote craft irrespective of the relative movements of the two crafts.

An object of our present invention is to provide such a system with means for scanning a remote area in the absence of received waves together with means responsive to waves received from the area scanned to interrupt the scanning operation while the system is directed in a direction sufficiently near the object from which the received waves arrive to enable the orientation of the system to be controlled by the direction of the received waves rather than by the scanning means. The scanning means may then be disabled and the orientation follows the remote object automatically.

A further object is to provide means such that the received waves take control of the orientation of the system despite the operation of the scanning control means.

Another object of our invention is to provide an indication when such received waves take control of the equipment so that the operator may then disable the scanning means.

Another object of our invention is to provide such automatic scanning means at a minimum of cost.

Another object of our invention is to provide improved means for manual control of the orientation of the system.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which Figs. 1, 2 and 3, when taken together represent an embodiment of our invention.

Figure 1:
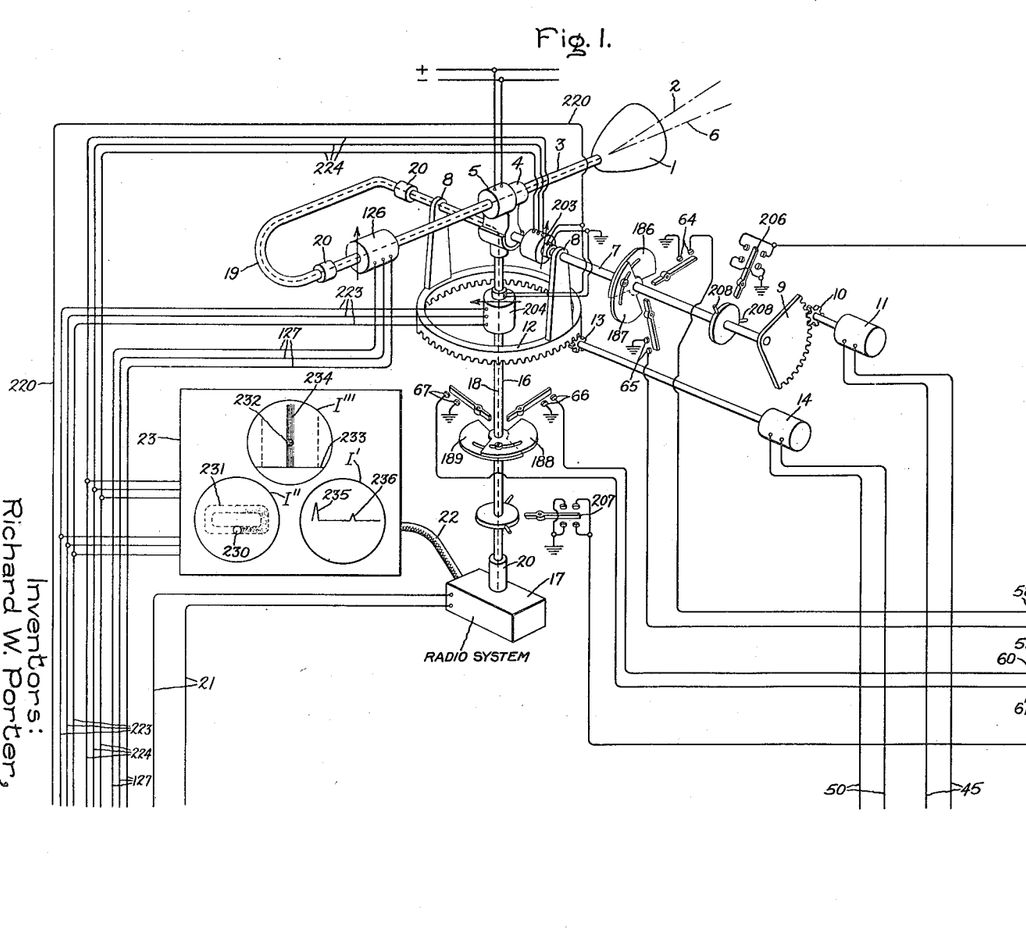

Referring to Fig. 1 of the drawing we have shown in the upper portion thereof, in a very conventional way, a radio system which may comprise an antenna arranged within, as at the focal plane of, a reflector 1. This reflector 1 may comprise any conducting surface, preferably in the form of a surface of revolution. Commonly such reflectors are of paraboloidal form having an antenna at the focal point thereof. This antenna, together with the reflector 1, may be considered to have a directivity pattern about an axis 2, this axis being the axis of directivity of the system. The reflector 1 may suitably be mounted on a shaft 3 arranged for rotation in a bearing 4, and such other bearings as may be required when driven by a motor 5 arranged on the shaft. The axis 6 of the shaft 3 extends at an angle of a few degrees to the axis of directivity 2 of the antenna system and accordingly the axis of directivity 2 is rotated about the axis 6 of the shaft 3, its path of revolution comprising the surface of a cone. Waves received from the direction of the axis 6 are therefore received with uniform intensity in all positions of the antenna system 1 in its rotation, except for such variations in intensity as may be produced by causes, such as, for example, changes in the plane of polarization of the antenna. Waves received from any direction other than the direction of axis 6, however, affect the receiving antenna differently by reason of its different orientation when the system is at different points in its path, and the result is a periodically varying response of the antenna to such waves. This periodically varying response has a time phase relation dependent upon the direction from which the waves are received with respect to the direction of orientation 6 and this time phase relation is utilized to control the orientation of the system, that is, to control the direction of the axis 6 to maintain that axis directed along the line of propagation of the received waves.

This cyclical variation in response of the system to waves received from directions other than the direction of axis 6 may be produced either by rotating the reflector, the antenna, or both as desired. In systems where the reflector is too large it is preferable to rotate only the antenna. To vary the orientation the center of symmetry of the antenna may be moved about the focus of the reflector without rotating the antenna itself. For reasons of mechanical simplicity of the antenna, however, the antenna itself may also be rotated about its point of symmetry.

The shaft 3 is arranged for rotation about the horizontal and the vertical axes. The bearing 4 is mounted for rotation about the axis of horizontal shaft 7. This shaft is mounted for rotation in bearings 8 and is provided with a gear sector 9, which cooperates with the gear 10 driven by a motor 11 whereby upon operation of the motor 11 the shaft 3 may be rotated in a vertical plane about the horizontal axis 7 thereby to project the axis of orientation 6 at any desired angle in the vertical plane. The bearings 8, supporting the horizontal shaft 7, may be supported upon a horizontal ring gear 12, which cooperates with the gear 13 driven by a motor 14 whereby upon operation of the motor the ring gear 12 is rotated in the horizontal plane thereby carrying the shaft 3 horizontally about the vertical axis which may be considered to comprise a shaft 16. Thus the antenna system may be directed in any direction in the horizontal plane.

The radio equipment associated with the antenna may be considered to be represented by the cube 17 shown on the drawing beneath the equipment thus far described. A transmission line extends from this equipment to the antenna of the system 1, this transmission line being represented by a dotted line 18 on the drawing, and extends through the vertical shaft 16 and through the horizontal shaft 7, thence through an interconnecting member 19 to the horizontal shaft 3 through which it passes to the antenna of the system 1. These various shafts are hollow to include the transmission line 18. This line may comprise a central conductor, which may be considered as represented by the dotted line 18, and an outer conductor which is grounded. Rotatable joints 20 are provided at the left end of the shaft 3, at the left end of the shaft 7, and at the bottom of the shaft 16 to permit rotation of these respective shafts about their own axes.

Figure 2:
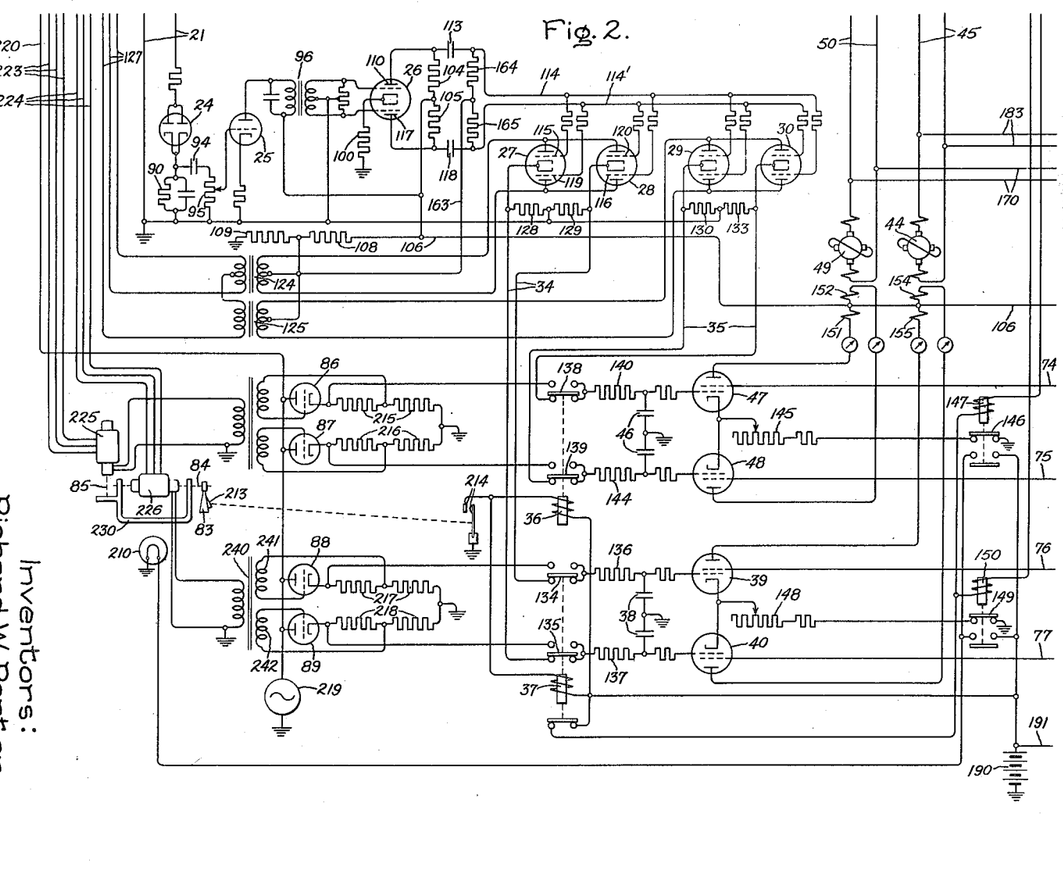

Radio frequency potentials induced in the antenna are supplied through the transmission line 18 to radio equipment 17 where it is amplified, converted in frequency as desired, detected, and the resulting pulses of unidirectional current are supplied over conductors 21 to equipment indicated in Fig. 2. They are also supplied through conductors represented by cable 22 to equipment 23 where they are utilized to control various cathode ray indicators three of which are indicated respectively at I', I" and I'''. The character of indication produced by these indicators is indicated in Fig. 1 and is described later herein.

The equipment of Fig. 2 comprises a plurality of electron discharge devices 24, 25, 26, 27, 28, 29 and 30. The devices 27, 28, 29 and 30 are arranged to produce two unidirectional voltages, one between conductors 34 and the other between conductors 35, the first varying in accord with the direction from which the signal is received in the vertical plane and the other varying in accord with the direction from which the signal is received in the horizontal plane, and each having magnitude and polarity dependent upon the angle between the axis 6 and the direction of propagation of the received waves projected upon the respective plane. The voltage between conductors 34 is supplied through contacts of relay 37 to condensers 38 connected between the control electrodes of discharge devices 39 and 40. The anode currents in these discharge devices control the voltage produced by generator 44 which in turn controls motor 11 over conductors 45.

Similarly the voltage between conductors 35 is supplied through contacts of relay 36 across condensers 46 connected between the control electrodes of discharge devices 47 and 48 which in turn control generator 49, the voltage of which is supplied to the motor 14 over conductors 50.

This portion of the system operates to maintain the antenna directed at any remote source of received waves. The electron discharge devices 39, 40, 47 and 48 are also controlled by equipment shown in Fig. 3 to effect scanning of a remote area. This equipment comprises a plurality of relays 54, 55, 56 and 57, which are connected through conductors 58, 59, 60 and 61 to certain contacts 64, 65, 66 and 67 associated with the rotating shafts of the system of Fig. 1. These relays operate to control a plurality of discharge devices 68, 69, 70 and 71, which in turn control the screen grid potentials of discharge devices 47, 48, 39 and 40 of Fig. 2 over conductors 74, 75, 76 and 77. This operation is such that in the absence of any received signal the system of Fig. 1 scans a remote area of space; that is, with the system described the direction of orientation of the system 1 is varied about the periphery of a rectangle in remote space in the absence of any received signal. If a signal be received during such scanning operation, it takes control of the discharge devices 39, 40, 47 and 48 and interrupts the scanning operation in a manner later to be described. The operator may then open switch 80 of Fig. 3 and thereby disable the scanning mechanism whereupon the system of Fig. 1 is maintained oriented in the direction of the received signal.

In the lower left hand corner of Fig. 2 is shown a handle 83 mounted upon a shaft 84 about which it may be rotated, and which may also be rotated about a shaft 85, together with means comprising discharge devices 86, 87, 88 and 89 which may also control the grids of discharge devices 39, 40, 47 and 48 to vary the orientation of the system of Fig. 1 in accord with the movements of the handle 83.

Figure 3:
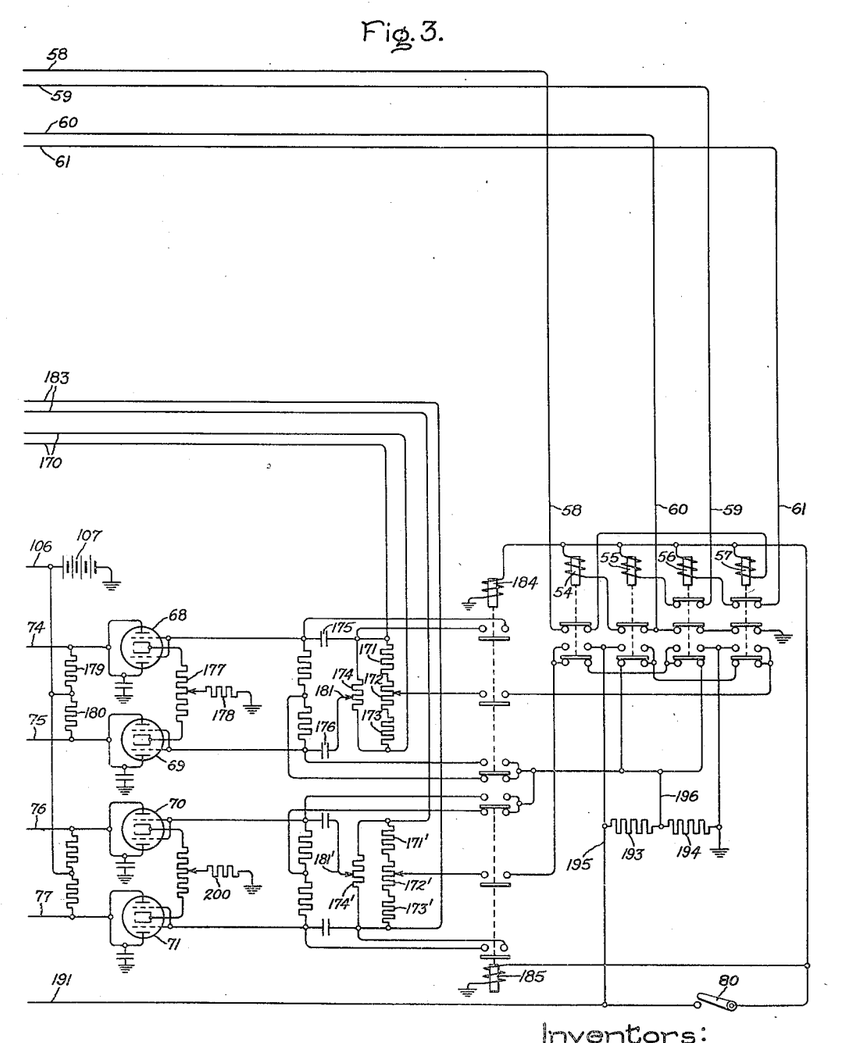
Figure 4:
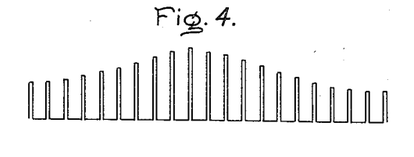
Figs. 4, 5, 6, 7, 8 and 9 represent certain characteristics of its operation.
Figure 5:
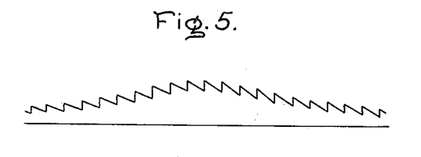

As previously indicated, waves received from the direction of the axis 6 are received with uniform intensity in all positions of the antenna. Waves received from any other direction, however, are received with greater intensity when the axis of directivity 2 is in closer agreement with the direction of propagation of received waves and with less intensity when it is least in agreement with said direction of propagation with the result that the signal supplied from the apparatus 17 over conductors 21 varies cyclically. Commonly wth equipment of the type described the received signal is an echo of pulses radiated by the system 1, these pulses being produced by the transmitter 17 and supplied to the antenna of system 1 for radiation thereby. Such pulses may impinge upon any remote reflecting surface, such as an aircraft, and be received on the antenna and transmitted to the equipment 17 where they are amplified, converted in frequency, translated to unidirectional pulses and then supplied over conductors 21 to the detector 24 of Fig. 2. These pulses may have the cyclically varying character shown in Fig. 4. They are demodulated by detector 24 and produce upon resistance 90 a cyclically varying unidirectional potential such as that indicated in Fig. 5. This potential is supplied through condenser 94 to resistance 95. A portion of this potential is supplied to the input of amplifier 25 where it is amplified and supplied through a frequency responsive coupling device 96, commonly a transformer as shown at 96, to the control electrodes of a pair of electron discharge devices in the envelope 26. These discharge devices are connected in balanced, or push pull, relation the cathodes being connected to ground through resistance 100 and the control electrodes being connected to the opposite terminals of the secondary winding of transformer 96. The anodes are connected together through resistances 104 and 105, the point between these resistances being connected through conductor 106 to the positive terminal of a source of operating potential 107, shown in Fig. 3. This source of operating potential is represented in Fig. 3, for simplicity, as a battery but, of course, in most applications it comprises the output circuit of a suitable alternating current rectifier. This source is shunted by a bleeder circuit comprising resistances 108 and 109 of Fig. 2.

The cyclical variations in the received signal produce potential variations of opposite phase upon the two anodes of the discharge devices in envelope 26. The potential on the anode 110 of the discharge device 26 is supplied through condenser 113 and conductor 114 to the upper control electrode 115 of the discharge device in envelope 27 and to the control electrodes 116 in the lower discharge device in envelope 28. The potential on the anode 117 of amplifier 26 is supplied through condenser 118 to the control electrode 119 of the lower discharge device in envelope 27 and to the upper control electrode 120 in envelope 28. These potentials are also supplied to corresponding control electrodes of the discharge devices in the envelopes 29 and 30.

The anodes of the upper discharge device in envelopes 27 and 28 are energized in phase but in opposite phase relation with the anodes of the lower discharge devices in these envelopes, these upper anodes being connected to one terminal of the secondary winding of transformer 124 and the lower anodes being connected to the lower terminal of this secondary winding. The anodes of the discharge devices in envelopes 29 and 30 are similarly connected with respect to the secondary winding of transformer 125. The primary windings of these transformers 124 and 125 are energized from a three-phase generator 126 mounted upon the rotating shaft 3 of the scanning equipment. Since this shaft rotates at the rate of rotation of the axis of directivity 2 about the axis of orientation 6, the frequency of the voltage supplied by the generator 126 is the same as the frequency of the cyclical variation in the received signal.

Any suitable means may be provided to vary the phase of the output from generator 126 with respect to the phase of the rotation of the axis of directivity for initial alignment and to compensate for phase shifts in the electrical circuits and amplifiers. Such means is indicated in Fig. 1 by the arrow through generator 126 and may comprise means for mechanically rotating the stator of generator 126 about shaft 3 or it may comprise suitable phase shift means in the electrical circuit of this generator. Similar means is indicated by the arrow through Selsyn generators 203 and 204 later referred to.

The voltage of generator 126 is supplied over the three conductors 127 to the primary windings of the transformers 124, 125. These transformers are connected in the ordinary, so-called, Scott fashion, the primary of transformer 124 being connected across one phase of the three-phase circuit and the primary winding of the transformer 125 being connected between the third phase of the three-phase circuit and a midtap on the primary winding of transformer 124. Thus the voltages across the secondary windings of transformers 124 and 125 are in quadrature phase relation.

If desired, of course, generator 126 may itself be a two-phase generator thus eliminating transformers 124 and 125.

The midtaps of these secondary windings are connected to a point of positive unidirectional potential between resistances 108 and 109. The potential on resistance 109 is less than the amplitude of alternating potential on the secondaries of transformers 124 and 125 so that each anode is driven negative with respect to its respective cathode during the negative half cycle of the anode operating potential.

The cathodes of the discharge devices in envelope 27 are connected together and to ground through resistance 128, and, similarly, the cathodes of the discharge devices in envelope 28 are connected together and to ground through resistance 129. The cathodes of the discharge devices in envelopes 29 and 30 are likewise connected to ground through corresponding resistances 130 and 133. The opposite terminals of resistances 128 and 129 are connected through conductors 34 and contacts 134 and 135 of relay 37 in its lower position and resistances 136 and 137 to the control electrodes of discharge devices 39 and 40. Between these electrodes are connected the capacitors 38 each of which is connected between the respective control electrode and ground. Similarly the opposite terminals of resistances 130 and 133 are connected through conductors 35, contacts 138 and 139 of relay 36 in its upper position, resistances 140 and 144 to the control electrodes of discharge devices 47 and 48. Between these control electrodes are connected the condensers 46, each being connected between its respective control electrode and ground. The cathodes of these devices 47 and 48 are connected through a variable resistance 145 and the contacts 146 of a relay 147 to ground. Similarly the cathodes of devices 39 and 40 are connected through variable resistance 148 and contacts 149 on relay 150 to ground. The anodes of the devices 47 and 48 are connected through respective field windings 151 and 152 of the amplidyne generator 49 and through conductor 106 to the source of potential 107. Similarly the anodes of devices 39 and 40 are connected through the respective windings 154 and 155 of amplidyne generator 44 and thence through conductor 106 to the source of operating potential. The relation between the currents in these two windings of each generator determines the magnitude and polarity of the voltage developed by the respective generator, which voltages are supplied over circuits 45 and 50 to the respective motors 11 and 14, which vary the orientation of the antenna system in elevation and azimuth, respectively, the direction of operation of these motors, of course, being dependent upon the polarity of the voltage supplied thereto.

The operation of the system as thus described may best be understood by reference to Figs. 6, 7, 8 and 9. As previously mentioned, a voltage such as that represented in Fig. 5 appears upon the resistance 90. The sawtooth, or serrated, character of this voltage is reduced by the tuned transformer 96 or alternatively by any other suitable low frequency coupling device and a substantially sinusoidal alternating voltage, such as that indicated in Fig. 6a, appears between the anodes 110 and 117 of the discharge device 26, this sine wave of voltage being applied in opposite phase to the two control electrodes in each of the discharge devices 27, 28, 29 and 30. The voltage supplied to the control electrodes in device 28 is reversed from that supplied to the control electrodes in device 27 and that supplied to the control electrodes in device 29 is opposite that supplied to the control electrodes in device 30.

Figure 6A:
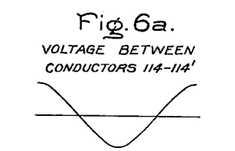

Let us assume, for example, that at a particular instant the axis of directivity 2 is directed at a remote source of radiation, or at a remote reflecting surface from which pulses radiated by the antenna 1 are received. Let us also assume that this remote source of radiation is directly below the axis of rotation 6 and that the cyclically varying voltage between the conductors 114 and 114' is as shown in Fig. 6a. The voltage from generator 126 may be so phased that this cyclically varying signal voltage either agrees in phase, or is in opposed phase relation with the voltage upon the anode of any of the discharge devices in envelopes 27 and 28. That is, the control electrode 115, for example, may be positive during the positive half cycle of its anode operating voltage and the control electrode 119 may be negative during the negative half cycle of the operating voltage applied to its associated anode, and similarly the control electrode 120 may be negative when its associated anode is positive and the control electrode 116 may be positive when its associated anode is negative. Since all of these control electrodes are biased positively with respect to their cathodes from resistance 109 through conductor 163 and resistances 164 and 165, a substantial anode current flows in each device when its anode is positive. The magnitude of this anode current is substantially unaffected by the anode voltage because of the magnitude of the cathode circuit resistors 128 and 129, which may be of the order of 100,000 ohms, but is controlled by the voltage impressed upon the control electrode. Thus since the control electrode 115 is positive when its associated anode is positive, an increase of current occurs in this device and in resistance 128. At the same time control electrode 120 is negative while the anode is positive thereby reducing the current flowing in this device and in resistance 129. Thus a voltage appears between conductors 34 during this particular half cycle of the received signal, which voltage may be considered as represented by the intermediate half cycle of the voltage wave 166 shown in Fig. 6c.

Of course, during this half cycle the anodes of the lower devices in these envelopes 27 and 28 are negative with respect to their cathodes and thus these control electrodes 119 and 116 have no effect. During the next half cycle, however, these lower anodes are positive and the control electrode 119 is positive while control electrode 116 is negative. This means again an increase in current in resistance 128 and a decrease in current in resistance 129, both in accordance with the cyclic character of the signal voltage. Thus the potential between conductors 34 continues in the form of the curve 166 shown in Fig. 6c.

Figure 6B:
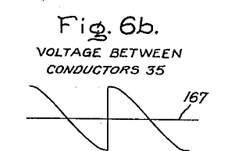
Figure 6C:
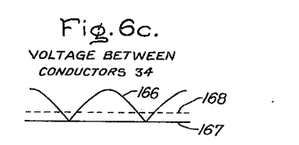

The curve 166 of Fig. 6c is asymmetrical with respect to the zero axis 167 and thus has a unidirectional component of the magnitude indicated by the distance between the axis 167 and the dotted line 168 in Fig. 6c. This cyclically varying wave 166 is supplied through resistances 136 and 137 to the condensers 38 where it produces an average unidirectional charge having the magnitude and polarity indicated by the dotted line 168 of Fig. 6c. The alternating component is substantially eliminated by the filtering effect of these condensers and resistances 136 and 137.

Let us assume that the polarity of this voltage on condensers 38 is such that the control electrode of device 39 varies in the positive direction and the control electrode of device 40 varies in the negative direction. Increased current then flows in the winding 155 of generator 44 and decreased current in the winding 154 of this generator. This causes a voltage to be developed by the generator between conductor 45 tending to drive the motor 11 in such a direction as to vary the orientation of the antenna system downwardly toward the source of the received waves.

Since the anodes of the discharge devices 29 and 30 are energized in quadrature with respect to the anodes in devices 27 and 28, the voltage which appears between the conductors 35 has the form indicated in Fig. 6b. This voltage is symmetrical with respect to the zero axis 167. Thus no charge is developed on the condensers 46 and the generator 49 develops no voltage and the motor 14 is, therefore, not operated.

Figure 7A:
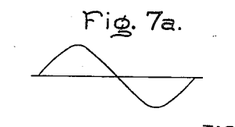

Now let us assume that the target of the radiated pulses is directly to the right of the axis of orientation 6. The maximum of the received waves now occurs one quarter cycle later than before, as indicated by Fig. 7a, so that the voltage on the control electrode of the upper device in envelope 29 is positive when its anode is positive and the voltage on the lower control electrode of this device is negative when the anode is negative. Thus the voltage between conductors 35 is of the form indicated in Fig. 7b and that between conductors 34 is of the form indicated in Fig. 7c. A unidirectional voltage is now developed on condensers 46 thereby causing generator 49 to produce a voltage which is supplied to the motor 14 to vary the orientation of the system in azimuth to orient the axis 6 toward the target.

Figure 7B:
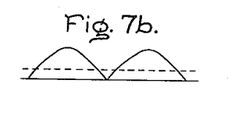
Figure 7C:
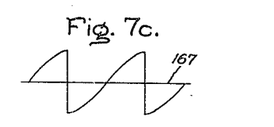

Since the wave of Fig. 7c is symmetrical with respect to the zero axis 167, no charge is developed on condenser 38 and the motor 11 is not operated.

Figure 8A:
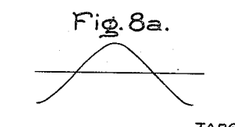
Figure 8B:
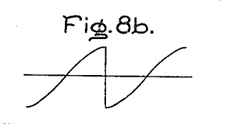
Figure 8C:
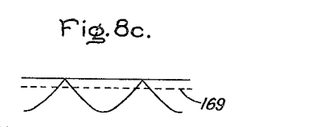

If the target be above the axis of rotation 6, then the situation represented by Figs. 8a, 8b and 8c is present. A unidirectional voltage indicated by the dotted line 169 of Fig. 8c exists on condensers 38 but is of opposite polarity from that which previously existed on these condensers as represented by the line 168 of Fig. 6c. This causes the operation of motor 11 to raise the orientation of axis 6.

Figure 9A:
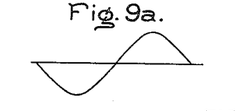
Figure 9B:
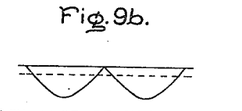
Figure 9C:
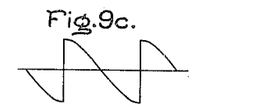

If the target be at the left of the axis of rotation, then the situation is represented by the curves of Figs. 9a, 9b and 9c where unidirectional voltage is indicated on condenser 46 opposite in polarity to that indicated in Fig. 7b, and motor 14 is operated to vary the orientation 6 toward the target.

It will, of course, be understood that if the target be in any other direction with respect to the axis 6, both motors may be operated simultaneously to direct the axis 6 at the target and that this operation goes on continuously thereby maintaining the axis 6 directed at the target. Of course, when the axis 6 is directed directly at the target, the cyclical variation in the received signal disappears and the motors 11 and 14 become de-energized, but as soon as there is any appreciable variation between the direction of the target and the direction of axis 6 this cyclical voltage variation exists and the motors respond to orient the axis 6 at the target.

In the operation of apparatus such as described, hunting is likely to occur; that is, either generator 44 or 49 produces a voltage to correct any deviation between the orientation of axis 6 and the direction of the target and this voltage continues until this deviation is corrected. It is not corrected, however, until the axis 6 is directed at the target within a very narrow range of accuracy with the result that because of the inertia of the rotating parts, etc., the axis 6 may be driven beyond the target. If this occurs, the phase of the cyclical variation in the received signal reverses, causing the voltage of generators 44 and 49 to reverse and the opposite correction to be brought about, but again the axis may be driven beyond the target, this cycle of operations repeating and setting up the usual hunting phenomenon.

To avoid this effect, the voltage of generator 49 is supplied through conductors 170 across a series of three resistances 171, 172 and 173. These resistances are shunted by a potentiometer 174 the upper terminal of which is connected through a condenser 175 to the control electrodes of discharge devices 68, and a variable contact 181 on potentiometer 174 is connected through condenser 176 to the control electrodes of discharge devices 69. The cathodes of these devices are connected together through a resistance 177 having a variable tap which is connected to ground through a resistance 178. The anodes of devices 68 and 69 are connected together through resistances 179 and 180, the point between these resistances being connected to the source of operating potential. The anodes of device 68 are also connected through conductor 74 to the screen grid of the discharge device 47, and the anodes of devices 69 are connected through conductors 75 to the screen grid of device 48.

In this way, whenever a charge is developed on condensers 46 in response to a received signal, generator 49 produces a voltage of a certain polarity to bring about the correction in orientation. That voltage is supplied through the discharge devices 68 and 69 to produce a voltage on the screen grids of devices 47 and 48, tending to counteract the initial effect of the charge on condensers 46 thereby to reduce the voltage produced by the generator 49. This reduces the tendency of the system to overshoot and avoids any hunting effect.

Of course, the generator 44 is also connected through conductors 183 and a network similar to that previously described to the input of discharge devices 70 and 71, which in turn control the screen grid potentials in discharge devices 39 and 40.

In the operation of the equipment as thus described it is necessary first to orient the system in the neighborhood of the remote target or source of radiation, such as a reflecting surface. Since the target may be invisible, however, either because of distance or atmospheric conditions, it is desirable that the remote space be scanned for the presence of any target that may exist therein. For this reason the system comprising relays 54, 55, 56, 57, 184 and 185 is provided. This relay system is connected through conductors 58, 59, 60 and 61 to switches 64, 65, 66 and 67 which are operated by cams 186, 187, 188 and 189, the first two of which are mounted upon the shaft 7 for rotation therewith and the latter two of which are mounted for rotation with shaft 16. These cams and this relay system are arranged to cause the equipment of Fig. 1 to scan a rectangle in remote space. When such scanning operation is desired, the operator closes the switch 80 shown in the lower portion of Fig. 3. This energizes relays 184, 185 and 54 from a source of potential 190 through obvious circuits including conductor 191 and switch 80. The source 190 may be of 24 volts and is shunted by equal resistances 193 and 194, as shown in Fig. 3. Thus conductor 195 is 24 volts positive with respect to ground and conductor 196, connected between resistors 193 and 194, is 12 volts positive with respect to ground. Prior to energization of relay 184, 185, this 12 volt conductor 196 is connected to all of the control electrodes of devices 68, 69, 70 and 71. It is connected through the lower armature of relay 184 in its lower position to the control electrodes of discharge devices 68 and 69, and it is connected through the upper armature of relay 185, in its lower position, to the control electrodes of discharge devices 70 and 71. Thus these control electrodes are normally all biased 12 volts above ground. Of course, because of current flowing in resistances 178 and 200, these control electrodes may be negative with respect to their associated cathodes. This condition with respect to devices 68 and 69 still exists after relay 184 operates since its lower armature maintains the control electrodes of device 69 connected to the 12 volt terminal 196 and its two upper armatures connect the control electrodes of device 68 to this 12 volt terminal through a path including the upper armature of relay 184, resistances 171 and 172, middle armature of relay 184, lower armature of relay 57 in its lower position, and lower armature of relay 55 in its lower position. Thus discharge devices 68 and 69 remain inactive.

Relay 185 by its upper armature maintains the control electrodes of device 70 connected to the 12 volt conductor 196. It, however, connects the control electrodes of device 71 to the 24 volt terminal 195 through a circuit extending from the control electrode of device 71 through the lower armature of relay 185, resistances 173' and 172', middle armature of relay 185, lower armature of relay 54 in its upper position to 24 volt conductor 195. Thus current passed by the anodes of discharge device 71 is greater than that passed by the discharge device 70 thereby driving the screen grid of discharge device 40 less positive than the screen grid of discharge device 39. This causes an unbalance of current in field windings 154 and 155 and a voltage is developed by generator 44 between conductors 45 of such polarity as to cause motor 11 to rotate in a direction to elevate the orientation of the antenna system.

This voltage developed by generator 44 is also supplied back through conductors 183 to resistances 171', 172', 173', which are shunted by potentiometer resistance 174'. A suitable portion of it, determined by the position of variable contact 181' on resistance 174', is supplied between the control electrodes of devices 70 and 71 with polarity opposing the initial voltage of 12 volts between these control electrodes. This reduces the voltage difference between these control electrodes, and between the screen grids of devices 39 and 40 and hence the difference in current in the two field windings 154 and 155 of generator 44 and, therefore, it reduces the voltage developed by this generator. The amplification of devices 70, 71, and 39, 40 is such that a relatively small potential between control electrodes of devices 70 and 71 causes full running excitation of generator 44. Therefore, the voltage developed by this generator during this running condition and hence the speed at which motor 11 is driven is determined by the position of contact 181' and may be varied by variation of that contact.

In this way, the voltage supplied initially to motor 11 is sufficiently greater than the voltage supplied during the normal running condition to produce rapid starting of the motor. This voltage is then automatically and rapidly reduced to a stable running, or equilibrium, value which continues during the remaining operation of the motor.

This operation not only has the advantage of producing rapid starting of the motor but also renders the speed at which it operates independent of variations in the characteristics of discharge devices 70, 71, 39 and 40 and independent of variations in the anode operating voltage supplied to these devices.

The operation of motor 11 continues to elevate the antenna until cam 187 engages the armature of switch 65 closing this switch. Conductor 59 is then grounded through switch 65 causing energization of relay 55 through the upper armature of relay 56. Relay 55 operates and by its upper armature deenergizes relay 54. Relay 54 becomes deenergized and its lower armature connects the control electrodes of the discharge device 71 to the 12 volt conductor 196 through the lower armature of relay 56 in its lower position. This in turn deenergizes the motor 11. The lower armature of relay 55, however, in its upper position connects the control electrodes of device 68 to the 24 volt conductor through a circuit which extends from the control electrodes of device 68 through the upper armature of relay 184 in its upper position, resistances 171 and 172, middle armature of relay 184 in its upper position, lower armature of relay 57 in its lower position, and lower armature of relay 55 in its upper position to the 24 volt conductor 195. Thus device 68 now passes more current than does device 69, thus lowering the voltage on the screen grid of device 47 to a value lower than that on the screen grid of device 48. This in turn causes generator 49 to supply voltage to motor 14 of such polarity as to operate the scanning device in the clockwise direction thereby moving the axis 6 to the right.

Of course, the voltage of generator 49 is likewise supplied back to potentiometer 174 and then between the control electrodes of devices 68 and 69, with polarity opposite the initial actuating voltage and to reduce this input voltage to the stable running value exactly as was described in connection with the operation of motor 11.

This operation of motor 14 continues until cam 188 causes the closing of switch 67 thereby grounding conductor 61 causing relay 56 to be energized through the upper armature of relay 57. Relay 56 operates and deenergizes relay 55. Relay 55 returns to its normal position and thus restores the connection of the upper control electrodes of device 68 to the 12 volt conductor 196 thereby deenergizing motor 14. The lower armature of relay 56 in its upper position now connects the control electrodes of device 71 to ground through a path as follows: control electrodes of device 71, lower armature of relay 185, resistances 172' and 172', middle armature of relay 185, lower armature of relay 54 in its lower position and lower armature of relay 56 in its upper position to ground. This means that discharge device 71 passes less current than discharge device 70 thereby increasing the screen grid voltage of discharge device 40 to a value greater than the voltage of device 39. This causes generator 44 to produce a voltage opposite in polarity to that last produced, driving the shaft 7 in a direction to lower the orientation of the antenna.

This operation continues until cam 186 causes the closing of switch 64 and the grounding of conductor 58, which in turn energizes relay 57 through the upper armature of relay 54. Relay 57 operates and by its upper armature deenergizes relay 56 which stops the downward rotation by deenergizing motor 11. By its middle armature it maintains the deenergization of relay 54. By its lower armature in its upper position it connects ground to the control electrodes of device 68 through a circuit which includes middle and upper armatures of relay 184. Thus device 68 now passes less current than device 69, thereby increasing the screen grid potential on device 47 with respect to that on device 48 and causing generator 49 to produce a potential of opposite polarity to that previously mentioned, thus driving the scanning system in a counterclockwise direction moving the axis 6 to the left. This operation continues until cam 188 causes closing of the contact 66 when relay 54 again becomes energized.

This cycle of operations repeats indefinitely thereby causing the axis 6 first to be moved upwardly, then to the right, then downwardly, thence to the left and thence again upwardly, continuously thereby scanning a rectangle in remote space. The dimensions of this rectangle may be varied by variations of cams 186, 187, 188, 189 about their respective shafts. The rate of this scanning operation is controlled by the position of the variable contacts 181 and 181'.

This operation is effected through the same discharge devices 68, 69, 70 and 71 through which the anti-hunting operation is secured and the devices 39, 40, 47 and 48 operate both in response to the scanning voltages controlled by the relay system of Fig. 3 as well as to the signal voltages received from the receiving system of Figs. 1 and 2.

This scanning operation may go on continuously or until such time as waves are received by the receiving system. If, for example, a remote aircraft flies into the area scanned, a signal cyclically varying as previously described is received in the receiving system. Voltages are then developed upon the condensers 38 and 46 in accord with the direction of the remote aircraft, and these voltages may be of sufficient magnitude to take control of the discharge devices 39, 40, 47 and 48 to cause the system to be oriented in the direction of the remote aircraft.

If the received signal is sufficiently strong such orientation occurs, as previously described. However, as axis 6 approaches the direction of the remote aircraft, the cyclic variation in the received signal decreases and the charges on condensers 38 and 46 tend to disappear. The potentials supplied to the screen grids of devices 47, 48; or 39, 40, from the scanning mechanism of Fig. 3, on the other hand, remain. Therefore the axis 6 does not become oriented directly toward the remote aircraft, but rather to one side, above, or below, depending on which of relays 54, 55, 56 and 57 is energized. The amount of the misalignment is such that the voltage across condensers 38 and 46 just balances the effect of the screen grid voltage applied by the devices 47, 48 or 39, 40 in the anode circuit of these devices.

If the intensity of the received echo be insufficient to balance the effect of the scanning voltages on the screen grids of devices 47, 48, 39, 40, in the anode circuits of these devices then the scanning operation continues but is affected in the following way by the received echo as the axis 6 passes in the neighborhood of the target: As the axis of orientation 6 approaches the target the voltage variation on condenser 38, 46 aids the voltage supplied to the screen grids of devices 47, 48; 39, 40 from the scanning system in producing voltage from generators 44 and 49 to orient the axis 6 toward the target. As axis 6 crosses the target the voltage due to the echo disappears and that from the scanning system tends to cause the system to resume its scanning operation. As the axis 6 leaves the target the voltage due to the echo reappears but opposes the scanning voltage and retards the motion of axis 6 away from the target. Thus the equipment tends to hasten its orientation toward the target and to hesitate in leaving the target.

The operator may, after observing either of these last two types of operations, open switch 80, thus deenergizing relays 184 and 185 and that one of relays 54 to 57 that may be energized and disabling the scanning system, whereupon the system accurately follows the remote target.

The indicators represented at I', I'' and I''' in Fig. 1 produce indications of the operations of the system and also indicate the direction and range of the remote target. These indications may be produced by cathode ray oscillographs on the viewing screens of which are produced indications, of which those shown in Fig. 1 are representative.

The cathode ray oscillograph I'' has its cathode ray deflected, by means not shown, about a circle as shown at 230 as the axis 2 is rotated about the axis 6. This ray is also deflected about a rectangular path 231 on the fluorescent screen as the axis 6 is scanned about the rectangle in remote space. The deflection voltages necessary to this control may be developed by the Selsyn devices 203 and 204 or by any other suitable means. During the scanning the luminescent circle 230 may be seen to move about the path 231 leaving a luminescent path behind it by reason of the persistence of the luminescence of the viewing screen. This persistence and the rate of scanning may be such that the entire path is to some extent luminescent.

If a target enters the remote rectangular area scanned, the luminescense of the circle 230 increases, first, because of the tendency of the system to hasten its orientation to the position corresponding to the position of the target and then to hesitate in that position, as previously described, and secondly, the ray may be rendered more intense in response to the echo from the remote target, as by controlling the grid of the cathode ray device in response to the received echo pulses.

If the remote target be near or of such character as to produce a strong echo such that the charges on condensers 38 and 46 have greater effect in the anode circuits of devices 39, 40 and 47, 48 than do the voltages supplied to the screen grids of these devices, the system then follows the remote target as previously described and the circle 230 leaves the path 231 and follows a path corresponding to the course of the target.

The presence of a target in the remote area scanned may be somewhat more readily observed from the screen of the cathode ray device I'''. The cathode ray of this device is deflected horizontally in accord with variations of the orientation in azimuth. It is deflected vertically for a distance corresponding to the range of the equipment and at a frequency high relative to the scanning movements in azimuth. The control electrode of this device is controlled by the received echo thereby to produce an illuminated spot at a point on the screen corresponding to the direction of the remote target in azimuth and corresponding to the range of the remote target. Such a spot is indicated at 232 at a distance from line 233 corresponding to the range. Because of the persistence of luminescence of the fluorescent screen and the high frequency of the vertical deflection as compared with the horizontal deflection, this spot appears in a luminescent column represented by the shaded area 234, having the width of the spot 232, and occurring at a position corresponding to the direction of the target in azimuth.

The presence of the remote target and its range may also be observed from indicator I' which may be operated as an ordinary cathode ray range indicator, i.e. the ray in this device is deflected horizontally across the screen in a predetermined interval starting with each radiated pulse, and it is deflected vertically by the radiated pulse and any echoes received during the interval. In the drawing two deflections are shown, that indicated at 235 representing the outgoing pulse and that indicated at 236 representing an echo thereof. These deflections are spaced apart in accord with the range to the remote target.

When the operator observes a target in the area scanned, he opens switch 80 to disable the scanning system. He then manually orients the equipment at the target and then leaves it to follow the target automatically. This procedure is usually preferred over that of allowing the system to follow the target directly because it may follow an undesired target or orient itself at a source of echo on the ground.

The manual orientation of the equipment toward a desired target may be effected by manipulation of the handle 83 shown in Fig. 2. This handle is provided with a switch control member 213, which when pressed closes contacts 214 thereby energizing relays 36 and 37. Operation of these relays disconnects the discharge devices 47, 48, 39 and 40 from conductors 34 and 35 and connects the control electrodes of these discharge devices to the respective cathodes of discharge devices 86, 87, 88 and 89, respectively. These devices are connected to control devices 47, 48, 39 and 40 to orient the system in accord with the position of manual control member 83 about either of two axes 84 and 85, the first corresponding to elevation and the latter corresponding to azimuth.

The cathodes of these latter discharge devices 86 to 89 are each connected to ground through a suitable pair of resistances 215, 216, 217, 218. The anodes are arranged to be energized in phase from a suitable source of alternating current 219.

This source of alternating current also supplies voltage over conductor 220 to the rotors of the two Selsyn transformer devices 203 and 204 the stators of which are connected through conductors 224 and 223 to the stators of Selsyn devices 226 and 225.

It will be observed that the stator of elevation transformer 226 is connected through the conductors 224 to the stator of the Selsyn transformer 203 the rotor of which is mounted upon the shaft 7 and which rotor, therefore, is positionable in accord with the position of the axis 6 in elevation. This position determines the relative magnitudes of the voltages between the different conductors 224. The voltage induced in the rotor winding of Selsyn transformer device 226 is zero when the handle 83 agrees in position with the orientation of axis 6 in elevation. Movement of this handle in either direction from this position causes voltage to be induced in the rotor of one phase, or the opposite phase, corresponding to the direction of the movement of the handle and of magnitude corresponding to the extent of the movement. This voltage is supplied to the primary of a transformer 240. This transformer has two secondaries 241 and 242 the voltage of each of which is supplied between the control electrode and cathode of the devices 88 and 89, respectively, in opposite phase relation. This voltage is of the same frequency as the voltage supplied to the anodes of the devices 88 and 89, and if it be in phase with the anode voltage in one device it is in phase opposite the anode voltage of the other device. Thus the anode current in one of these devices is decreased while that in the other device is increased. In this way the magnitude and polarity of the voltage between the cathodes of the two devices 86 and 87 may be varied as desired by rotation of the arm 83 about the shaft 84, this unidirectional voltage being supplied to the control electrodes of the devices 39 and 40 to effect the desired control of the motor 11 to vary the orientation of axis 6 in elevation to the position corresponding to the position of handle 83 about shaft 84. Rotation of the rotor of Selsyn transformer 203 varies the relative magnitudes of the voltages between conductors 224 and hence that across the primary of transformed 240 until the cathodes of devices 88 and 89 are at equal unidirectional potential with respect to ground. When this occurs, motor 11 becomes deenergized and stops. In this way the orientation of axis 6 may be varied to any position in elevation by simple rotation of handle 83 about axis 84.

The Selsyn transformer device 225 is connected in exactly the same way with respect to the discharge devices 86 and 87, and 47 and 48, and it is connected through conductors 223 to the azimuth transformer 204 the rotor of which rotates with shaft 16. Selsyn transformer 226, carrying handle 83, may be mounted in bearings in a bracket 230, which may be rotatable about, or geared with, axis 85, thereby to rotate that shaft in accord with the desired orientation of axis 6 in azimuth. Thus if the arm 83, together with the bearing bracket 230 and Selsyn device 226, be rotated as a unit about the shaft 85, a corresponding control of the device devices 86, 87, 47, and 48 and azimuth motor 14 may be effected to vary the orientation of axis 6 to the direction of the target. When the target appears upon the screen of the cathode ray devices I', I'', I''', or on that one of these indicating devices which the operator may be using at the time, the switch member 213 is released thereby deenergizing relays 36 and 37 and the equipment then automatically follows the remote target.

The control electrodes of devices 86, 87, 88 and 89 are each connected through the respective transformer secondary, to a point between the resistances of the respective pairs of cathode resistances 215, 216, 217 and 218. If this connection were made to ground, then the cathode potential would follow the control electrode potential and no amplification by the respective discharge device would be had. By connecting the control electrodes to intermediate points upon the respective cathode resistances the amplification of the discharge devices 86, 87, 88 and 89 is increased and, in addition, the cathodes may be at an average potential of the order of that between conductors 34 and conductors 35. In this way operation of relays 36 and 37 does not produce large abrupt changes in voltages between the control electrodes of devices 47, 48 and 39, 40.

In proximity to handle 83 is positioned a signal lamp 210. This lamp is energized from source 100 when either of two limit relays 147 and 150 becomes energized. These latter relays become energized in response to closure of limit switches 206 or 207, respectively. These switches are closed by operation of their respective armatures to either of two opposite positions from an intermediate position when corresponding shaft 7 or 16 is rotated to the limit of its movement.

Thus, for example, let us assume that the equipment is following a remote craft and that craft exceeds the range of the equipment in elevation. One of two prongs 208 on shaft 7 engages the armature of switch 206 causing it to close its contacts and energize relay 147. Relay 147 operates and opens the anode-cathode circuit of discharge devices 47 and 48 thereby stopping the upward movement of axis 6 and closing the circuit of lamp 210. The operator, on observing the lamp and noting what has happened, may change the position of his own craft and reorient his equipment by use of handle 83 and thus again direct the equipment at the remote craft.

While we have shown a particular embodiment of our invention, it will of course be understood that we do not wish to be limited thereto since many modifications both in the circuit arrangement and in the instrumentalities employed may be made, and we contemplate by the appended claims to cover any such modifications as fall within the true spirit and scope of our invention.

What we claim as new and desire to secure by Letters Patent of the United States is:

1. In combination, a directive radio receiving system, means to vary the orientation of said system about an area of remote space in a plane at right angles to the directive axis of said system in accord with a predetermined pattern, means responsive to waves received in said receiving system to maintain said system oriented in the direction of propagation of received waves, and means to control said orientation in joint response to action of both of said two means.

2. In combination, a directive radio receiving system, means to vary the orientation of said system in accord with a predetermined pattern about an area of remote space in a plane at right angles to the direction of orientation of said system, means responsive to waves received in said receiving system to maintain said system oriented in the direction of propagation of received waves, means responsive to radio waves received during variation of said orientation in accord with said pattern to affect said orientation, means to indicate continuously said orientation, and means responsive to said received waves to interrupt operation of said first means.

3. The combination, in a directive radio receiving system, of a motor connected to vary the orientation of said system, means cyclically to vary the voltage supplied to said motor to vary the orientation of said system in accord with a predetermined cycle, means responsive to waves received in said receiving system to control the voltage supplied to said motor, manual means operable in accord with desired directions of orientation of said receiving system, and means to control the voltage supplied to said motor to vary the orientation of said receiving system in response to and in accord with the operation of said manual means.

4. In combination, a directive radio receiving system, means to vary the orientation of said receiving system in accord with a predetermined pattern about a desired area of a remote plane at right angles to the directive axis of said system, a cathode ray device having a viewing screen, means to indicate continuously on said viewing screen the position of said orientation in said area, and means responsive to waves received in said receiving system during said variation in said orientation to alter said variation in orientation in said area whereby the reception of said waves is indicated on said screen.

5. In combination, a directive radio receiving system, means to vary the orientation of said receiving system in accord with a predetermined pattern about a desired area of a remote plane at right angles to the directive axis of said system, a cathode ray device having a viewing screen, means to indicate continuously on said viewing screen the position of said orientation in said area, means responsive to waves received in said receiving system during said variation in said orientation to vary said orientation in said area in accord with the direction from which said waves are received whereby the reception of said waves is indicated on said screen, and means to disable said first orientation varying means whereby said variation is controlled by said received wave responsive means.

6. In combination, a directive radio system, and means automatically to vary the orientation thereof about a rectangle in remote space, said means comprising a plurality of relays, means to operate each relay in response to variation in orientation of said system from a predetermined direction to a respective corner of said rectangle, and means responsive to operation of each relay to vary said orientation from said respective corner toward the next adjacent corner of said rectangle.

7. In combination, a directive radio system, voltage responsive means to vary the orientation of said system in either direction in a predetermined plane in accord with the polarity of voltage supplied thereto, means to supply two unidirectional voltages thereto, means to reverse the polarity of one of said voltages when said orientation is at either limit of its movement in said plane thereby to produce scanning action of said system in said plane, and means to control the polarity of said other voltage in accord with the relation between the direction of orientation of said system and the direction of propagation of received waves thereby to maintain said system oriented along said direction of propagation in said plane, said other voltage having magnitude so related to said one voltage that said scanning action is interrupted when radio waves are received.

8. In combination, in a directive radio system, of motor means to vary the direction of orientation of said system, means responsive to waves received in said system to supply voltage to said motor means to maintain said system directed in the direction from which said signals arrive, electron discharge means responsive to said voltage to control said voltage supply means to prevent hunting of said system, and means responsive to predetermined variations in the orientation of said system to control said electron discharge means to vary said orientation through a predetermined cycle.

9. The combination, in a directive radio system, of motor means to vary the orientation thereof, a generator to supply voltage to said motor means, said generator having a pair of field windings, a pair of electron discharge devices each connected to control one of said field windings, means to control said discharge devices in response to signals received in said system to maintain said system directed in the direction from which said signals arrive, and means responsive to predetermined variations in orientation of said system to control said discharge device to vary said orientation in accord with a predetermined cycle, the control of said discharge devices by said first control means predominating over said control by said last control means whereby said predetermined cycle is interrupted in response to signals received in said system.

10. The combination, in a directive radio system, of motor means to vary the orientation thereof, a generator to supply voltage to said motor means, said generator having a pair of field windings, a pair of electron discharge devices each connected to control one of said field windings and each having a pair of control grids, means responsive to predetermined variations in orientation of said system to supply voltages to one of said control grids of each device to vary the orientation of said system in accord with a predetermined cycle, and means responsive to radio waves received in said system to supply potentials to the other control grid of each of said devices to interrupt said cycle and to orient said system in the direction from which said waves arrive.

11. The combination, in a directive radio system, of motor means to vary the orientation thereof, a generator to supply said motor, said generator having a pair of field windings, means responsive to radio waves received in said system to vary oppositely the energization of said field windings thereby to vary said orientation in the direction from which said waves arrive, manual orienting means for said system, said manual means including a control member positionable in accord with the orientation desired, means responsive to said position of said control member oppositely to vary the energization of said windings thereby to produce corresponding change in orientation of said system, and means responsive to change in position of said orientation to agree with the position of said control member to restore the energization of said windings.

12. The combination, in a radio scanning system, of motor means to vary the orientation of said system, electron discharge means arranged to have voltage applied thereto and to supply voltage to said motor means in accord with said applied voltage, means responsive to predetermined variation in orientation of said system to apply voltage to said discharge means to actuate said motor means, and means to supply voltage from said motor means to said discharge means to oppose said first voltage thereby to reduce the voltage supplied to said motor, whereby higher voltage is supplied to said motor means during its starting period than is supplied during its running period.

13. The combination, of a directive radio system, voltage generating means to vary the orientation of said system to scan in accord with a predetermined pattern an area of remote space in a plane perpendicular to the direction of orientation of said system, means responsive to radio waves received by said system during operation of said first means to generate a second voltage in accord with variation in the direction from which said waves are received, means selectively responsive to said two voltages in accord with their relative intensities for varying the orientation of said system, and indicating means responsive to said second voltage for indicating the variation in orientation of said system.

RICHARD W. PORTER.
ANTHONY G. LINOWIECKI.

REFERENCES CITED

The following references are of record in the file of this patent:

UNITED STATES PATENTS

| Number | Name | Date |
|---|---|---|
| 1,862,119 | Little | June 7, 1932 |
| 1,915,328 | Mirick | June 27, 1933 |
| 2,138,966 | Hafner | Dec. 6, 1938 |
| 2,189,549 | Hershberger | Feb. 6, 1940 |
| 2,231,929 | Lyman | Feb. 18, 1941 |
| 2,308,521 | Lear | Jan. 19, 1943 |
| 2,409,448 | Rost et al | Oct. 15, 1946 |